United States Patent [19]
White et al.

[11] Patent Number: 6,093,664
[45] Date of Patent: Jul. 25, 2000

[54] ADSORBENT FOR METAL IONS AND METHOD OF MAKING AND USING

[75] Inventors: Lloyd R. White, Minneapolis; Susan H. Lundquist, White Bear Township, both of Minn.

[73] Assignee: 3M Innovative Properties Company, St. Paul, Minn.

[21] Appl. No.: 09/357,677

[22] Filed: Jul. 20, 1999

Related U.S. Application Data

[60] Division of application No. 08/918,113, Aug. 27, 1997, Pat. No. 5,935,380, which is a continuation-in-part of application No. 08/612,528, Mar. 8, 1996, abandoned.

[51] Int. Cl.[7] .............................. B32B 5/02; B01D 39/08
[52] U.S. Cl. ...................... 442/121; 210/502.1; 210/504; 210/507; 428/317.9
[58] Field of Search ........................ 442/121; 428/317.9; 210/502.1, 504, 507

[56] References Cited

U.S. PATENT DOCUMENTS

| | | | |
|---|---|---|---|
| 3,296,123 | 1/1967 | Prout et al. | 210/38 |
| 5,397,476 | 3/1995 | Bradbury et al. | 210/675 |
| 5,407,889 | 4/1995 | Remes | 502/400 |
| 5,688,370 | 11/1997 | Hagen et al. | 162/146 |
| 5,935,380 | 8/1999 | White et al. | 159/48.1 |

FOREIGN PATENT DOCUMENTS

| | | |
|---|---|---|
| 217 143 A2 | 4/1987 | European Pat. Off. . |
| 0522856 A1 | 1/1993 | European Pat. Off. . |
| 0575612 A1 | 12/1993 | European Pat. Off. . |
| WO 96/29146 | 9/1996 | WIPO . |

OTHER PUBLICATIONS

A Review of Information on Ferrocyanate Solids for Removal of Cesium from Solutions,: P.A. Haas, Sep. Sci. Technol. 28(17–18, 2479–2508) Dec. 1993.

Evaluation of Selected Ion Exchangers for the Removal of Cesium and Strontium from MVST W–25 Supernate,: J.L. Collins, et al., ORNL/TM–12938, Apr. 1995.

Kirk–Othmer Encyclopedia of Chemical Technology, 4th Ed., John Wiley & Sons, NY, Dec. 1993, vol. 8, pp. 475–519.

C. Strumillo and T. Kudra. "Drying: Principles, Applications and Design," Gordon and Breach, NY, Dec. 1986, pp. 352–359.

Abstract for Japanese 63/130,137 issued Jun. 2, 1988.

Abstract for Japanese 63/305,297 issued Dec. 13, 1988.

*Spray Drying Handbook*, K. Masters, First Edition, John Wiley & Sons, New York, Dec. 1972, pp. 465–475; pp. 510–511; and pp. 521–538.

*Spray Drying Handbook*, K. Masters, Fourth Edition, John Wiley & Sons, New York, Dec. 1985, pp. 481–483; pp. 533–534; and pp. 548–567.

*Webster's Third New International Dictionary of the English Language Unabridged*, vol. III, H to R, Encyclpedia Britannica, Inc., Merriam–Webster, Inc., Chicago, Dec. 1986, p. 1462, definition of monodisperse highlighted.

*Primary Examiner*—Blaine Copenheaver
*Attorney, Agent, or Firm*—Gary L. Griswold; Robert W. Sprague; William J. Bond

[57] ABSTRACT

A method comprises the step of spray-drying a solution or slurry comprising (alkali metal or ammonium) (metal) hexacyanoferrate particles in a liquid, to provide monodisperse, substantially spherical particles in a yield of at least 70 percent of theoretical yield and having a particle size in the range of 1 to 500 micrometers, said particles being active towards Cs ions. The particles, which can be of a single salt or a combination of salts, can be used free flowing, in columns or beds, or entrapped in a nonwoven, fibrous web or matrix or a cast porous membrane, to selectively remove Cs ions from aqueous solutions.

18 Claims, 1 Drawing Sheet

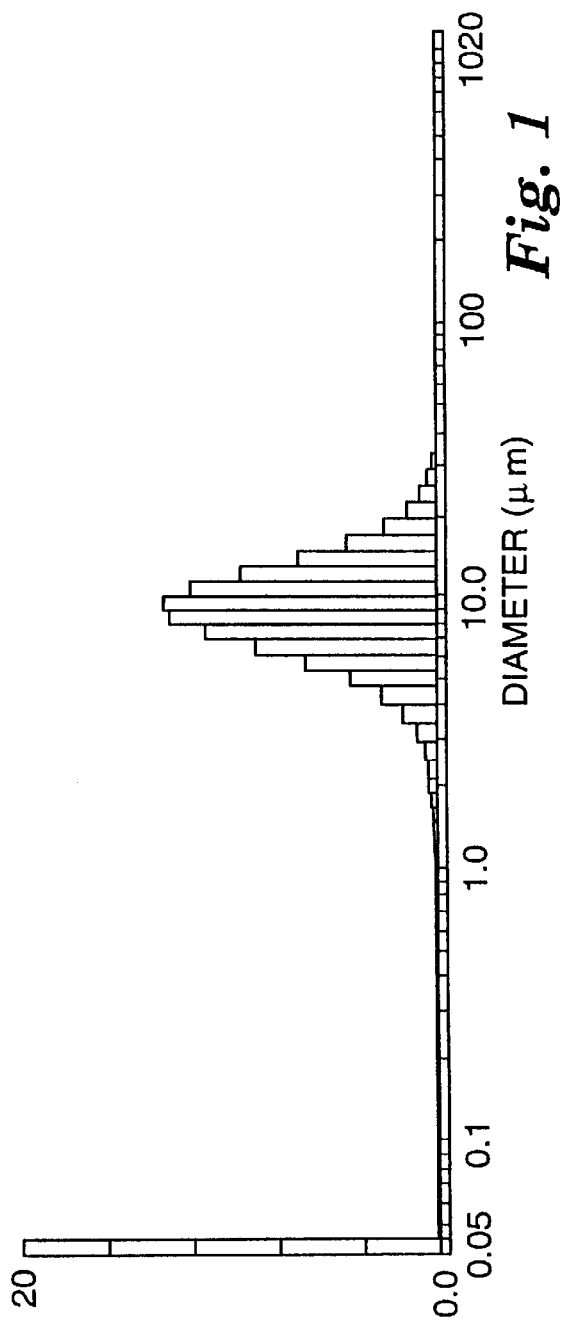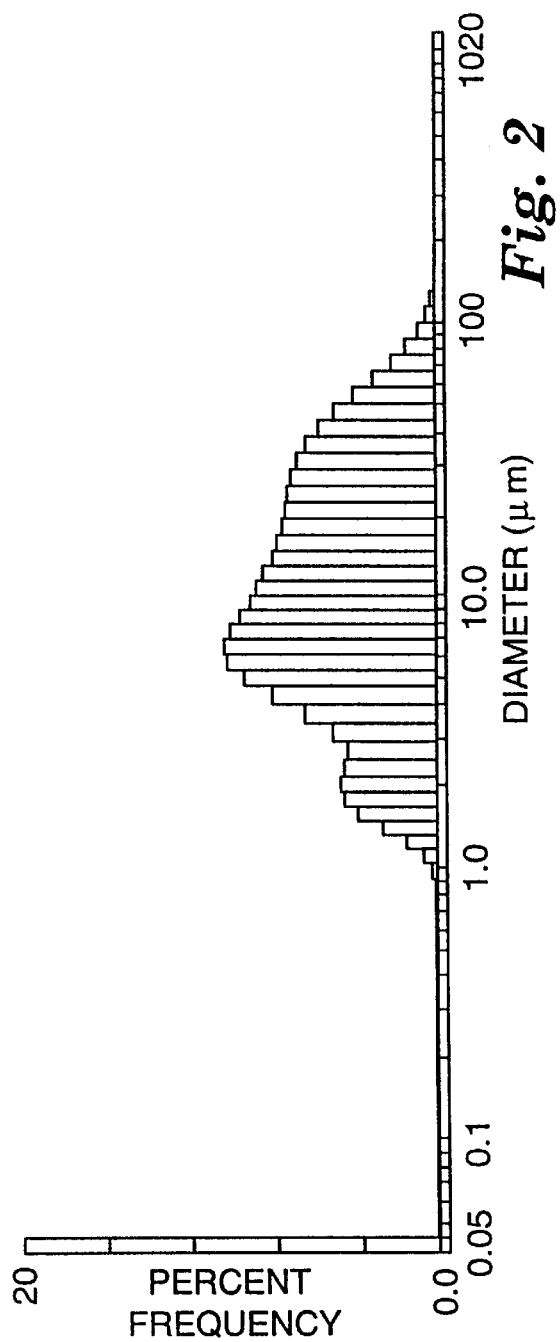

ADSORBENT FOR METAL IONS AND METHOD OF MAKING AND USING

This is a divisional of application Ser. No. 08/918,113 filed Aug. 27, 1997, now U.S. Pat. No. 5,935,380, which is a continuation-in-part of application Ser. No. 08/612,528 filed Mar. 8, 1996, now abandoned.

The invention was made with Government support under Subcontract 203690-A-F1, with Battelle Memorial Institute, Pacific Northwest Laboratories, based on a Contract DE-AC06-76RLO-1830 awarded by the Department of Energy, and under Contract DE-AR21-96MC 33089, awarded by The Department of Energy. The Government has certain rights in the invention.

FIELD OF THE INVENTION

The present invention pertains to substantially spherical, monodisperse sorptive particles and a method therefor, and a method of using the particles in loose form, in a column, or enmeshed in a web or membrane for extraction of cesium ions from solution. The method and particles are useful in the remediation of nuclear wastes.

BACKGROUND OF THE INVENTION

Potassium cobalt hexacyanoferrate is known in the art as an effective adsorbent for cesium ions and has found important use in removing radioactive cesium ions from nuclear wastes via an ion exchange process. The method has been described, for example, in U.S. Pat. No. 3,296,123; in "A Review of Information on Ferrocyanate Solids for Removal of Cesium from Solutions," P. A. Haas, Sep. Sci. Technol. 28 (17–18), 2479–2508 (1993); and in "Evaluation of Selected Ion Exchangers for the Removal of Cesium and Strontium from MVST W-25 Supernate," J. L. Collins, et al., ORNL/ TM-12938, April 1995.

Potassium cobalt hexacyanoferrate, hereinafter referred to as "KCOHEX," has typically been prepared by a method in granular form as described in U.S. Pat. No.3,296,123; wherein an aqueous acidic solution of potassium ferrocyanide is slowly mixed with an aqueous solution of cobalt nitrate, as shown in Formula I.

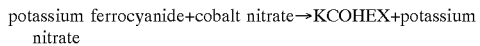

potassium ferrocyanide+cobalt nitrate→KCOHEX+potassium nitrate

Water is removed by centrifugation, the wet cake is washed with water, then dried in an oven to form a dried solid mass. The solid mass is ground and sized, and particles of from about 150 micrometers to about 450 micrometers are packed into columns for subsequent exposure to radioactive wastes containing, in particular, Cesium-137.

The method of preparing particulate KCOHEX and other hexacyanoferrates suffers from two significant drawbacks. First, grinding the dried solids must be done carefully so as to minimize formation of unusable fines. Second, since a wide range of particle sizes results from grinding, the particulate must be sized through sieves. These operations are time-consuming and inevitably cause loss of product.

As described in the references noted above, sized KCOHEX is then loaded into columns in order to remove cesium from radioactive waste solutions.

Spray-drying of solid materials is a method known in the art for preparation of useful solids. See, for example, Kirk-Othmer Encyclopedia of Chemical Technology, 4th Ed., John Wiley & Sons, New York, 1993; Vol. 8, p. 475–519, particularly pp. 505–508; and C. Strumillo and T. Kudra, "Drying: Principles, Applications and Design," Gordon and Breach, New York, 1986, pp. 352–359. However, in all of the reports of preparation and use of KCOHEX, a spray drying process has not been described.

SUMMARY OF THE INVENTION

Briefly, the present invention provides a method comprising the step of:

spray-drying a solution or slurry comprising (alkali metal or ammonium) (metal) hexacyanoferrate particles, wherein metal is selected from Periodic Table (CAS version) Groups VIII, IB, and IIB to provide monodisperse, sorbent particles in a yield of at least 70 percent of theoretical yield and having an average particle size in the range of 1 to 500 micrometers, said sorbents being active towards Cs ions. Preferably, the hexacyanoferrate particles are substantially spherical in shape and less than 20 percent by weight of particles have a size 5 micrometers or smaller. Combinations of hexacyanoferrates can be especially useful to remove Cs ions from aqueous solutions.

The sorbents preferably are selected from the group consisting of (potassium or ammonium) (metal) hexacyanoferrates wherein the metal preferably is selected from Fe, Ru, Os, Rh, Ir, Co, Ni, Pd, Pt, Cu, Ag, Au, Zn, Cd, and Hg. More preferably, the sorbents are selected from the group consisting of potassium cobalt hexacyanoferrate (KCOHEX), potassium zinc hexacyanoferrate (KZNHEX), potassium iron hexacyanoferrate, potassium copper hexacyanoferrate, potassium nickel hexacyanoferrate, potassium cadmium hexacyanoferrate, and ammonium iron hexacyanoferrate. The liquid in the solution or slurry can be aqueous or organic liquid.

In a further aspect, there are disclosed substantially spherical sorbent particles having a particle size in the range of 1 to 500 micrometers, the particles being sorptive towards Cs ions in solution. Preferably, the spherical particles can be potassium cobalt hexacyanoferrate, potassium zinc hexacyanoferrate, potassium iron hexacyanoferrate, potassium copper hexacyanoferrate, potassium nickel hexacyanoferrate, potassium cadmium hexacyanoferrate, and ammonium iron hexacyanoferrate. The particles can be used in columns or beds to selectively remove Cs ions which can be radioactive from aqueous solutions.

In yet another aspect, the loose spray-dried sorbents which preferably are potassium cobalt hexacyanoferrate, potassium zinc hexacyanoferrate, potassium nickel hexacyanoferrate, potassium copper hexacyanoferrate, potassium iron hexacyanoferrate, potassium cadmium hexacyanoferrate, or ammonium iron hexacyanoferrate particles can be introduced into a Cs ion containing solution, equilibrated with the solution, and then separated from the sorbed and/or exchanged metal ions.

In a still further aspect, the spherical sorptive particles that have been spray-dried can be enmeshed in nonwoven, fibrous webs, matrices, or membranes. The webs, matrices, or membranes, which preferably are porous, can be used in solid phase extraction (SPE) procedures to selectively remove Cs ions from aqueous solutions.

In yet another aspect, the invention provides an SPE device, such as a cartridge which in preferred embodiments can be pleated or spirally wound, comprising a fibrous non-woven SPE web comprising spherical, monodisperse particles which, in preferred embodiments, can be any of potassium cobalt hexacyanoferrate, potassium zinc hexacyanoferrate, potassium iron hexacyanoferrate, potassium copper hexacyanoferrate, potassium nickel hexacyanoferrate, potassium cadmium hexacyanoferrate, and ammonium iron hexacyanoferrate or potassium nickel hexacyanoferrate particulate and aramid fibers enclosed in a cartridge device. Preferably, tile web is porous.

In yet another embodiment, the invention provides a method of removing the specified metal ions from an aqueous solution comprising passing the aqueous solution by or through a fibrous non-woven SPE web or matrix or membrane comprising the above-described spherical, monodisperse particles which can be any of the sorptive particles made by the method of this invention, the particles preferably being any of hexacyanoferrates disclosed herein. Preferably, the web is porous.

In another embodiment, the invention provides a method of removing the specified metal ion from an aqueous solution comprising passing the aqueous solution through an SPE column comprising spherical, monodisperse sorptive particles made by the method of this invention, the particles preferably being any of hexacyanoferrate particulates disclosed herein.

In yet another aspect, the method further comprises the step of heating spherical metal or ammonium hexacyanoferrate particles, after drying, at a temperature of at least 115° C., preferably 115 to 130° C. for up to 12 hours. In the case of KCOHEX, the particles can be heated until their color changes from green to purplish-black.

In this application,

"size" means the diameter of a spherical particle or the largest dimension of an irregularly shaped particle;

"monodisperse" means a monomodal particle size distribution (i.e., particles of uniform size in a dispersed phase preferably having an average size range of 1 up to about 60 micrometers, preferably about 5 to about 30 micrometers, as illustrated by FIG. 1;

"drain time" means the time required to dewater a slurry of particles and fibers when making a sheet; and "substantially spherical" means particles that are spherical, ovoid (having an elliptical cross-section), raspberry-like, or toroidal, and are free of sharp corners;

"particles" and "particulate" are used interchangeably;

"web", "matrix", and "membrane" are used interchangeably and each term includes the others;

"sorptive" or "sorb" means by one or both of absorption and adsorption; and

"heavy metal" refers to metals having a molecular weight of at least 50; and

The overall process yield in making particles of the invention using a spray-dryer with a diameter of at least 1 meter is at least 70 percent preferably 80–90 percent, or more compared to a yield of about 60 percent or less when using prior art ground and sieved particles. Preferably, the resulting particles are free of submicron size particles, with not more than 20 percent of particles being <5 µm in size. The spray-drying process substantially eliminates product particles having submicron sizes.

Additionally, free-flowing spherical particles will pack with point contact in columns, resulting in less channeling and a lower pressure drop during extraction compared with, for example, irregularly shaped prior art particles having the same average size. Irregularly shaped prior art particles, particularly those less than 5 micrometers in size can pack tightly and lead to a high pressure drop in extraction applications. When irregularly shaped prior art particles are greater than 50 micrometers in size, channeling can result as liquids pass through, resulting in poor separations.

Further, the advantages of the particles of the invention include reduced drain time by a factor of at least about 1.5 times or more compared to non-spherical, irregularly shaped, prior art particles typically obtained from a grinding process, when incorporated in a sheet article.

Further, sheet articles can be made using particles of this invention, whereas in many cases sheet articles cannot be made from prior art ground and sieved particles because of excessive drain time or inability to control the sheet forming process. The sheet articles formed from spray-dried particles often have lower flow resistance than sheet articles made from ground and screened particles and are therefor more efficient in use.

BRIEF DESCRIPTION OF THE DRAWING

FIG. 1 is a graph of the monodisperse particle-size distribution for spray-dried KNIHEX of Example 3.

FIG. 2 is a graph of the particle-size distribution for ground KNIHEX of Example 4 (comparative).

DETAILED DESCRIPTION OF PREFERRED EMBODIMENTS

In preferred embodiments, sorptive particles useful in the present invention include substantially spherical sorptive particles of hexacyanoferrates, preferably any of potassium cobalt hexacyanoferrate (KCOHEX), potassium zinc hexacyanoferrate (KZNHEX), potassium nickel hexacyanoferrate (KNIHEX) potassium iron hexacyanoferrate (KFEHEX), potassium copper hexacyanoferrate (KCUHEX), potassium cadmium hexacyanoferrate (KCDHEX), and ammonium iron hexacyanoferrate, ($NH_4FEHEX$). These particles are useful to sorb cesium (Cs), which may be in its radioactive forms.

It is desirable to have low solubility because it is preferred the adsorbent does not dissolve in use.

It is now recognized that spherical (potassium or ammonium) (metal) hexacyanoferrate particles can be prepared by mixing at 0° to 5° C. an aqueous solution of potassium ferrocyanide (available from Aldrich Chemical Co., and many other suppliers) with an aqueous solution of metal nitrate, buffered to a pH of 5–6 using acetic acid as the buffering agent. The immediately formed precipitate of (potassium or ammonium) (metal) hexacyanoferrate is collected and thoroughly washed with water. When cobalt nitrate solution or zinc nitrate solution are used, for example, the resulting slurry will contain potassium cobalt hexacyanoferrate (KCOHEX) or potassium zinc hexacyanoferrate (KZNHEX) respectively.

The wet precipitate of (alkali metal or ammonium) (metal) hexacyanoferrates which comprises particles of irregular shapes can be slurried with liquid, preferably water, and then spray-dried preferably using a spinning disk atomizer and collecting the resulting substantially spherical KCOHEX or other metal hexacyanoferrate particles having an average size in the range of about 1 to 60 micrometers, preferably 5 to 30 micrometers, most preferably 5 to 15 micrometers, with a most preferred average size of about 9 to 12 micrometers. In the case of KCOHEX, preferably, the spherical particles are then heated until the color changes from green to purplish black but the particle size remains substantially unchanged. It is desirable to avoid drying the hexacyanoferrate particles prior to the spray-drying procedure.

In some applications it may be desirable to limit tile size of the metal or ammonium/metal particles in the slurry that is to be spray-dried. For example, particles that are to be incorporated into nonwoven fibrous webs, matrices, or membranes desirably are spray-dried from slurries wherein the particles are at most 20 micrometers, preferably at most 10 micrometers, and most preferably at most 1 micrometer in average size, to provide the monodisperse, substantially spherical sorbent particles described above.

It is preferred that the particles in the slurry not be dried prior to subjecting to the spray drying technique.

Spray-drying of the slurry can be accomplished using well-known techniques which include the steps of:

1) atomization, using a spinning disk, of the material introduced into the dryer;

2) removing of moisture, as, for example, by contact of the material with hot gas; and 3) separation of dry product from the exhaust drying agent.

The slurry preferably has a solids content in the range of 3 to 15 percent by weight, more preferably 5 to 10 percent by weight, and most preferably 5 to 7.5 percent by weight, to ensure smooth operation of the apparatus.

After spray-drying, the particles are free-flowing with most preferred average diameters in the range of 9–12 micrometers. When KCOHEX is used, particles are dark green in color. The cyanoferrates preferably are heated at about 115° C. for about 12 hours after drying to achieve maximum absorption capacity for cesium or other metal ions.

The particle can be evaluated for its ion exchange capacity (see Brown, G. N., Carson, K. J., DesChane, J. R., Elovich, R. J., and P. K. Berry. September 1996. *Chemical and Radiation Stability of a Proprietary Cesium Ion Exchange Material Manufactured from WWI, Membrane and Superlig™ 644.* PNNL-11328, Pacific Northwest National Laboratory, Richland, Wash.) by testing for the batch distribution coefficient or $K_d$ which is described as follows:

The batch distribution coefficient, $K_d$ is an equilibrium measure of the overall ability of the solid phase ion exchange material to remove an ion from solution under the particular experimental conditions that exist during the contact. The batch $K_d$ is an indicator of the selectivity, capacity, and affinity of an ion for the ion exchange material in the presence of a complex matrix of competing ions. In most batch $K_d$ tests, a known quantity of ion exchange material is placed in contact with a known volume of solution containing the particular ions of interest. The material is allowed to contact the solution for a sufficient time to achieve equilibrium at a constant temperature, after which the solid ion exchange material and liquid supernate are separated and analyzed. In this application, the batch $K_d$s were determined by contacting 0.01 g of tile particle with 20 mL of PWTP (Process Waste Treatment Plant simulant solution) (see formulation below).

| PWTP Waste Simulant Composition | |
| --- | --- |
| Species | Molarity (M) |
| CaCO$_3$ | 9.14E$^{-4}$ |
| Ca(NO$_3$)$_2$·4H$_2$O | 4.27E$^{-5}$ |
| CaCl$_2$ | 1.60E$^{-5}$ |
| MgSO$_4$ | 2.1E$^{-4}$ |
| MgCl$_2$·6H$_2$O | 1.18E$^{-4}$ |
| Ferri-Floc | 0.04 ml/L |
| NaF | 4.21 E$^{-5}$ |
| Na$_3$PO$_4$·12 H$_2$O | 2.2 E$^{-5}$ |
| Na$_2$SiO$_3$·9H$_2$O | 1.1 E$^{-3}$ |
| NaHCO$_3$ | 1.29 E$^{-3}$ |
| K$_2$CO$_3$ | 1.28 E$^{-5}$ |
| CsNO$_3$ | 3.4 E$^{-4}$ |

Ferri-Floc™ (Tennessee Chemical Co., Atlanta, Ga.) is a solution containing 10,000 ppm Iron and 25,800 ppm SO$_4$.

The equation for determining the $K_d$ can be simplified by determining the concentration of the analyte before and after contact and calculating the quantity of analyte on the ion exchanger by difference.

$$K_d = \left(\frac{(C_I - C_f)}{C_f}\right)\left(\frac{V}{M * F}\right)$$

Where: $C_r$ is the initial amount or activity of the ion of interest in the feed solution prior to contact,
$C_r$ is the amount or activity after contact,
V is the solution volume,
M is the exchanger mass,
F is the mass of dry ion exchanger divided by the mass of wet ion exchanger (F-factor).

$K_d$ (normal units are mL/g) represents the theoretical volume of solution (mL) that can be processed per mass of exchanger (dry weight basis) under equilibrium conditions. Lambda, the theoretical number of bed volumes of solution that can be processed per volume of exchanger, is obtained by multiplying $K_d$ by the exchanger bed density, $p_h$ (g of resin per mL of resin) as shown below:

$\lambda = K_d * P_h$

The lambda value provides a method for comparing the ion exchange performance of a wide variety of materials on a volume basis (e.g., in all ion exchange column).

More preferably, the experimental equipment that was required to complete the batch $K_d$ determinations included an analytical balance, a constant temperature water bath, an oven for F-factor determinations, a variable speed shaker table, 20-mL scintillation vials, 0.45 µm syringe filters, the appropriate ion exchanger, and simulant solutions. The particles were all dried thoroughly prior to testing. Approximately 0.01 g of each material was contacted with 20 mL of the PWTP solution. The sample bottles were placed into a 25° C. constant temperature bath and shaken lightly for 20 hours. The samples were then filtered with a 0.45 micrometer syringe filter to separate the resin material from the solution and the resulting liquid was analyzed for cesium by ICP-MS(Inductively coupled plasma -mass spectrometry) for Cs.

The particles of the invention can be enmeshed in various fibrous, nonwoven webs or matrices which preferably are porous. Types of webs or matrices include fibrillated polytetrafluoroethylene (PTFE), microfibrous webs, macrofibrous webs, and polymer pulps.

1. Fibrillated PTFE

The PTFE composite sheet material of the invention is prepared by blending the particulate or combination of particulates employed with a PTFE emulsion until a uniform dispersion is obtained and adding a volume of process lubricant up to approximately one half the volume of the blended particulate. Blending takes place along with sufficient process lubricant to exceed sorptive capacity of tile particles in order to generate the desired porosity level of the resultant article. Preferred process lubricant amounts are in the range of 3 to 200 percent by weight in excess of that required to saturate the particulate, as is disclosed in U.S. Pat. No. 5,071,610, which is incorporated herein by reference. The aqueous PTFE dispersion is then blended with the particulate mixture to form a mass having a putty-like or dough-like consistency. The sorptive capacity of the solids of the mixture is noted to have been exceeded when small amounts of water can no longer be incorporated into the mass without separation. This condition should be maintained throughout the entire mixing operation. Tile putty-like mass is then subjected to intensive mixing at a temperature and for a time sufficient to cause initial fibrillation of the PTFE particles. Preferably, the temperature of intensive mixing is up to 90° C., more preferably it is in the range of 0° to 90° C., most preferably 20° to 60° C. Minimizing the mixing at the specified temperature is essential in obtaining extraction media and chromatographic transport properties.

Mixing times will typically vary from 0.2 to 2 minutes to obtain the necessary initial fibrillation of the PTFE particles. Initial mixing causes partial disoriented fibrillation of a substantial portion of the PTFE particles.

Initial fibrillation generally will be noted to be at an optimum within 60 seconds after the point when all components have been fully incorporated into a putty-like (dough-like) consistency. Mixing beyond this point will produce a composite sheet of inferior extraction medium and chromatographic properties.

Devices employed for obtaining the necessary intensive mixing are commercially available intensive mixing devices which are sometimes referred to as internal mixers, kneading mixers, double-blade batch mixers as well as intensive mixers and twin screw compounding mixers. The most popular mixer of this type is the sigma-blade or sigma-arm mixer. Some commercially available mixers of this type are those sold under the common designations Banbury mixer, Mogul mixer, C. W. Brabender Prep mixer and C. W. Brabender sigma blade mixer. Other suitable intensive mixing devices may also be used.

The soft putty-like mass is then transferred to a calendering device where the mass is calendered between gaps in calendering rolls preferably maintained at a temperature up to 125° C., preferably in the range of 0° to about 100° C., more preferably in the range of 20° C. to 60° C., to cause additional fibrillation of the PTFE particles of the mass, and consolidation while maintaining the water level of the mass at least at a level of near the sorptive capacity of the solids, until sufficient fibrillation occurs to produce the desired extraction medium. Preferably the calendering rolls are made of a rigid material such as steel. A useful calendering device has a pair of rotatable opposed calendering rolls each of which may be heated and one of which may be adjusted toward the other to reduce the gap or nip between the two. Typically, the gap is adjusted to a setting of 10 millimeters for the initial pass of the mass and, as calendering operations progress, the gap is reduced until adequate consolidation occurs. At the end of the initial calendering operation, the resultant sheet is folded and then rotated 90° to obtain biaxial fibrillation of the PTFE particles. Smaller rotational angles (e.g., 20° to less than 90°) may be preferred in some extraction and chromatographic applications to reduce calender biasing, i.e., unidirectional fibrillation and orientation. Excessive calendering (generally more than two times) reduces the porosity which in turn reduces the solvent wicking in thin layer chromatography (TLC) and the flow-through rate in the filtration mode.

During calendering, the lubricant level of the mass is maintained at least at a level of exceeding the absorptive capacity of the solids by at least 3 percent by weight, until sufficient fibrillation occurs and to produce porosity or void volume of at least 30 percent and preferably 40 to 70 percent of total volume. The preferred amount of lubricant is determined by measuring the pore size of the article using a Coulter Porometer as described in the Examples below. Increased lubricant results in increased pore size and increased total pore volume as is disclosed in U.S. Pat. No. 5,071,610.

The calendered sheet is then dried under conditions which promote rapid drying yet will not cause damage to the composite sheet or any constituent therein. Preferably drying is carried out at a temperature below 200° C. The preferred means of drying is by use of a forced air oven. The preferred drying temperature range is from 20° C. to about 70° C. The most convenient drying method involves suspending the composite sheet at room temperature for at least 24 hours. The time for drying may vary depending upon the particular composition, some particulate materials having a tendency to retain water more than others.

The resultant composite sheet preferably has a tensile strength when measured by a suitable tensile testing device such as an Instron (Canton, Mass.) tensile testing device of at least 0.5 MPa. The resulting composite sheet has uniform porosity and a void volume of at least 30 percent of total volume.

The PTFE aqueous dispersion employed in producing the PTFE composite sheet of the invention is a milky-white aqueous suspension of minute PTFE particles. Typically, the PTFE aqueous dispersion will contain about 30 percent to about 70 percent by weight solids, the major portion of such solids being PTFE particles having a particle size in the range of about 0.05 to about 0.5 micrometers. The commercially available PTFE aqueous dispersion may contain other ingredients, for example, surfactant materials and stabilizers which promote continued suspension of the PTFE particles.

Such PTFE aqueous dispersions are presently commercially available from Dupont de Nemours Chemical Corp., for example, under the trade names Teflon™ 30, Teflon™ 30B or Teflon™ 42. Teflon™ 30 and Teflon™ 30B contain about 59 percent to about 61 percent solids by weight which are for the most part 0.05 to 0.5 micrometer PTFE particles and from about 5.5 percent to about 6.5 percent by weight (based on weight of PTFE resin) of non-ionic wetting agent, typically octylphenol polyoxyethylene or nonylphenol polyoxyethylene. Teflon™ 42 contains about 32 to 35 percent by weight solids and no wetting agent but has a surface layer of organic solvent to prevent evaporation. A preferred source of PTFE is FLUON™, available from ICI Americas, Inc. Wilmington, Del. It is generally desirable to remove, by organic solvent extraction, any residual surfactant or wetting agent after formation of the article.

In other embodiments of the present invention, the fibrous membrane (web) can comprise non-woven, macro- or microfibers preferably selected from the group of fibers consisting of polyamide, polyolefin, polyester, polyurethane, glass fiber, polyvinylhalide, or a combination thereof. The fibers preferably are polymeric. (If a combination of polymers is used, a bicomponent fiber may be obtained.) If polyvinylhalide is used, it preferably comprises fluorine of at most 75 percent (by weight) and more preferably of at most 65 percent (by weight). Addition of a surfactant to such webs may be desirable to increase the wettability of the component fibers.

2. Macrofibers

The web can comprise thermoplastic, melt-extruded, large-diameter fibers which have been mechanically-calendered, air-laid, or spunbonded. These fibers have average diameters in the general range of 50 μm to 1,000 μm.

Such non-woven webs with large-diameter fibers can be prepared by a spunbond process which is well known in the art. (See, e.g., U.S. Pat. Nos. 3,338,992, 3,509,009, and 3,528,129, the fiber preparation processes of which are incorporated herein by reference.) As described in these references, a post-fiber spinning web-consolidation step (i.e., calendering) is required to produce a self-supporting web. Spunbonded webs are commercially available from, for example, AMOCO, Inc. (Naperville, Ill.).

Non-woven webs made from large-diameter staple fibers can also be formed on carding or air-laid machines (such as a Rando-Webber™ Model 12BS made by Curlator Corp., East Rochester, N.Y.), as is well known in the art. See, e.g., U.S. Pat. Nos. 4,437,271, 4,893,439, 5,030,496, and 5,082,720, the processes of which are incorporated herein by reference.

A binder is normally used to produce self-supporting webs prepared by the air-laying and carding processes and is optional where the spunbond process is used. Such binders can take the form of resin systems which are applied after web formation or of binder fibers which are incorporated into the web during the air laying process.

Examples of common binder fibers include adhesive-only type fibers such as Kodel™ 43UD (Eastman Chemical Products, Kingsport, Tenn.) and bicomponent fibers, which are available in either side-by-side form (e.g., Chisso ES Fibers, Chisso Corp., Osaka, Japan) or sheath-core form (e.g., Melty™ Fiber Type 4080, Unitika Ltd., Osaka, Japan). Application of heat and/or radiation to the web "cures" either type of binder system and consolidates the web.

Generally speaking, non-woven webs comprising macrofibers have relatively large voids. Therefore, such webs have low capture efficiency of small-diameter particulate (reactive supports) which is introduced into the web. Nevertheless, particulate can be incorporated into the non-woven webs by at least four means. First, where relatively large particulate is to be used, it can be added directly to the web, which is then calendered to actually enmesh the particulate in the web (much like the PTFE webs described previously). Second, particulate can be incorporated into the primary binder system (discussed above) which is applied to the non-woven web. Curing of this binder adhesively attaches the particulate to the web. Third, a secondary binder system can be introduced into the web. Once the particulate is added to the web, the secondary binder is cured (independent of the primary system) to adhesively incorporate the particulate into the web. Fourth, where a binder fiber has been introduced into the web during the air laying or carding process, such a fiber can be heated above its softening temperature. This adhesively captures particulate which is introduced into the web. Of these methods involving non-PTFE macrofibers, those using a binder system are generally the most effective in capturing particulate. Adhesive levels which will promote point contact adhesion are preferred.

Once the particulate (reactive supports) has been added, the loaded webs are typically further consolidated by, for example, a calendering process. This further enmeshes the particulate within the web structure.

Webs comprising larger diameter fibers (i.e., fibers which average diameters between 50 μm and 1,000 μm) have relatively high flow rates because they have a relatively large mean void size.

3. Microfibers

When the fibrous web comprises non-woven microfibers, those microfibers provide thermoplastic, melt-blown polymeric materials having active particulate dispersed therein. Preferred polymeric materials include such polyolefins as polypropylene and polyethylene, preferably further comprising a surfactant, as described in, for example, U.S. Pat. No. 4,933,229, the process of which is incorporated herein by reference. Alternatively, surfactant can be applied to a blown microfibrous (BMF) web subsequent to web formation. Polyamide can also be used. Particulate can be incorporated into BMF webs as described in U.S. Pat. No. 3,971,373, the process of which is incorporated herein by reference.

Microfibrous webs of the present invention have average fiber diameters up to 50 μm, preferably from 2 μm to 25 μm, and most preferably from 3 μm to 10 μm. Because the void sizes in such webs range from 0.1 μm to 10 μm, preferably from 0.5 μm to 5 μm, flow through these webs is not as great as is flow through the macrofibrous webs described above.

4. Cast Porous Membranes

Solution-cast porous membranes can be provided by methods known in the art. Such polymeric porous membranes can be, for example, polyolefin including polypropylene, polyamide, polyester, polyvinyl chloride, and polyvinyl acetate fibers.

5. Fibrous Pulps

The present invention also provides a solid phase extraction sheet comprising a porous fibrous pulp, preferably a polymeric pulp, comprising a plurality of fibers that mechanically entrap active particles, and preferably a polymeric hydrocarbon binder, the weight ratio of particles to binder being at least 13:1 and the ratio of average uncalendered sheet thickness to effective average particle diameter being at least 125:1.

Generally, the fibers that make up the porous polymeric pulp of the SPE sheet of the present invention can be any pulpable fiber (i.e., any fiber that can be made into a porous pulp). Preferred fibers are those that are stable to radiation and/or to a variety of pHs, especially very high pHs (e.g., pH=14) and very low pHs (e.g., pH=1). Examples include polyamide fibers and those polyolefin fibers that can be formed into a pulp including, but not limited to, polyethylene and polypropylene. Particularly preferred fibers are aromatic polyamide fibers and aramid fibers because of their stability to both radiation and highly caustic fluids. Examples of useful aromatic polyamide fibers are those fibers of the nylon family. Polyacrylic nitrile, cellulose, and glass can also be used. Combinations of pulps can be used.

Examples of useful aramid fibers are those fibers sold under the trade name Kevlar™ (DuPont, Wil., Del.). Kevlar™ fiber pulps are commercially available in three grades based on the length of the fibers that make up the pulp. Regardless or the type of fiber(s) chosen to make up the pulp, tile relative amount of fiber in the resulting SPE sheet (when dried) ranges from about 12.5 percent to about 30 percent (by weight), preferably from about 15 percent to 25 percent (by weight).

Useful binders in the SPE sheet of the present invention are those materials that are stable over a range of pHs (especially high pHs) and that exhibit little or no interaction (i.e., chemical reaction) with either the fibers of the pulp or the particles entrapped therein. Polymeric hydrocarbon materials, originally in the form of latexes, have been found to be especially useful. Common examples of useful binders include, but are not limited to, natural rubbers, neoprene, styrene-butadiene copolymer, acrylate resins, and polyvinyl acetate. Preferred binders include neoprene and styrene-butadiene copolymers. Regardless of the type of binder used, the relative amount of binder in the resulting SPE sheet (when dried) is about 3 percent to about 7 percent, preferably about 5 percent. The preferred amount has been found to provide sheets with nearly the same physical integrity as sheets that include about 7 percent binder while allowing for as great a particle loading as possible. It may be desirable to add a surfactant to the fibrous pulp, preferably in small amounts up to about 0.25 weight percent of the composite.

Because the capacity and efficiency of the SPE sheet depends on the amount of particles included therein, high particle loading is desirable. The relative amount of particles in a given SPE sheet of the present invention is preferably at least about 65 percent (by weight), more preferably at least about 70 percent (by weight), and most preferably at least about 75 percent (by weight). Additionally, the weight percentage of particles in the resulting SPE sheet is at least 13 times greater than the weight percentage of binder, preferably at least 14 times greater than the weight percentage of binder, more preferably at least 15 times greater than the weight percentage of binder.

Regardless of the type or amount of the particles used in the SPE sheet of the present invention, they are mechanically entrapped or entangled in the fibers of the porous pulp. In other words, the particles are not covalently bonded to the fibers.

Objects and advantages of this invention are further illustrated by the following examples. The particular materials and amounts thereof, as well as other conditions and details, recited in these examples should not be used to unduly limit this invention.

EXAMPLES

Example 1

Potassium cobalt hexacyanoferrate (KCOHEX) was prepared by slowly adding an aqueous solution of 1 part 0.3 M potassium ferrocyamide in an acetic acid buffer (approximately $1.8 \times 10^{-3}$ M in acetic acid) cooled to between 0° C. and 4° C. at 4° C. at pH of between 5 and 6 to an aqueous solution of 2.4 parts 0.5 M cobalt nitrate (present in excess) cooled to between 0° C. and 4° C. with constant stirring. Precipitate was separated from the reaction mixture using a centrifuge (Bird Centrifuge Model IIP200, Bird Machine Co., South Walpole, Mass.) by separating the initial precipitate, then repeatedly slurrying the precipitate in water and re-centrifuging, for a total of four washings. Excess cobalt nitrate is pink in color, so the desired solid material was centrifuged until the supernatant liquid was no longer pink.

The clean precipitate was again slurried in water at a concentration of 7.5 percent by weight, then spray-dried using a Bowen Model BE-1174 spray dryer (Niro Atomizer, Inc., Columbia, Md.), as follows:
Inlet air temperature: 210° C.
Atomizing pressure: 276 Kpa (40 psig)
Slurry feed rate: 1.25 gal/hr (4.73 L/hr)
Outlet temperature: 95° C.
Cyclone differential pressure: 4.5 in $H_2O$ ($11.43 \times 10^{-3}$ kg/cm$^2$).

Recovered dried potassium cobalt hexacyanoferrate represented 92 percent yield, and was observed under an Olympus BH2 microscope (Olympus America, Inc., Melville, N.Y.) to be spherical in shape. Measurement of the particles using a Horiba Model LA-900 Particle Size Analyzer (Horiba Instruments, Inc., Irvine, Calif.), showed an average particle size of approximately 11 micrometers and a particle size distribution of from about 7 micrometers to about 60 micrometers.

The spray-dried material was dark green in color. The spherical particles were heated in an air-vented oven at approximately 100° C. until they changed to a purplish-black color. Recovery from heating was essentially quantitative, and no loss of size or shape was noted as a result of the heating procedure.

Example 2 (Comparative)

Potassium cobalt hexacyanoferrate was prepared as described in Example 1, except that the solid precipitate obtained from the final centrifuge wash was spread out in a thin layer about 2.5 cm thick on a drying tray and heated in air at 110° C.–115° C. until the solid had dried and its color had changed from green to purplish-black. The dried solid was subjected to cryogenic hammer-milling by means of a Model D Comminutor (Fitzpatrick Co., Elmhurst, Ill.) using a 325-mesh screen (0.044 mm sieve opening) and the resulting powder was sized in a hydrocyclone (Richard Mozley Ltd., Cornwall, UK). Particles in the range of from about 1 to about 50 micrometers in their largest dimension were retained, with an average particle size of approximately 10–15 micrometers. Yield of sized particles was approximately 60 percent. As expected from a milling process, particles were typically irregular in shape (significant deviation from spherical) and a broad particle size distribution was obtained. The yield was significantly less in the particle size range desired.

Example 3

Potassium zinc hexacyanoferrate (KZNHEX) was prepared by slowly adding an aqueous solution of 1 part 0.5 M potassium ferrocyanide (0.28 moles) (pH was adjusted to pH 5.0–5.1 using concentrated acetic acid) cooled to between 0° C. and 4° C. at to an aqueous solution of 2.0 parts 0.3 M zinc nitrate (0.34 moles) cooled to between 0° C. and 4° C. with constant stirring. Precipitate was separated from the reaction mixture using a centrifuge (Centrifuge Model 460G, International Equipment Company, Boston, Mass.) by separating the initial precipitate, then repeatedly slurrying the precipitate in water and re-centrifuging, for a total of four washings.

The clean precipitate was again slurried in water at a concentration of 7.5 percent by weight, then spray-dried using a Niro Atomizer, Model 68 Order # 093-1413-00, Serial #2402 spray dryer (Niro Atomizer, Inc., Columbia, Md.), as follows:
Inlet air temperature: 190° C.
Spinning Disc RPM's: 400 KPa (58 psig)
Slurry feed rate: 2.4 L/hr
Outlet temperature: 85° C.
Cyclone magnahelic pressure: 0.47 in $H_2O$ ($1.19 \times 10^{-3}$ kg/cm$^2$).

Recovered dried potassium zinc hexacyanoferrate was observed under an SEM (Cambridge model S240, LEO Electromicroscopy, Inc., Thornwood, N.Y.) to be spherical in shape. Measurement of the particles using a Horiba Model LA-900 Particle Size Analyzer (Horiba Instruments, Inc., Irvine, Calif.), showed an average particle size (average diameter) of approximately 11.8 micrometers with about 20 weight percent less than 5 μm in size.

The raspberry-shaped particles were heated in an air-vented oven at approximately 115° C. for 18 hours. Recovery from heating was essentially quantitative, and no loss of size or shape was noted as a result of the heating procedure.

Example 4 (Comparative)

Potassium zinc hexacyanoferrate was prepared as described in Example 3, except that the solid precipitate obtained from the final centrifuge wash was spread out in a thin layer about 2.5 cm thick on a drying tray and heated in air at 115° C. for 18 hours until the solid had dried. The dried solid was broken up from its clumps using a mortar and pestle. The average particle size of the material was 0.636 micrometers so no further grinding was done. The particles were observed under an SEM (Cambridge Model S240), and were observed to be typically irregular in shape (significant deviation from spherical). All particles were less than 1 µm in size.

Example 5

Potassium nickel hexacyanoferrate (KNIHEX) was prepared by slowly adding an aqueous solution of 1 part 0.3 M potassium ferrocyanide (0.86 moles) (pH was adjusted to pH 5.0–5.1 using concentrated acetic acid) cooled to between 0° C. and 4° C. at to an aqueous solution of 1.44 parts 0.3 M nickel nitrate (1.23 moles) cooled to between 0° C. and 4° C. with constant stirring. Precipitate was separated from the reaction mixture using a centrifuge (Centrifuge Model 460G International Equipment Company, Boston, Mass.) by separating the initial precipitate, then repeatedly slurrying the precipitate in water and re-centrifuging, for a total of four washings.

The clean precipitate was again slurried in water at a concentration of 7.5 percent by weight, then spray-dried using a Niro Atomizer Model 68, order #093-1413-00, Serial #2402 spray dryer (Niro Atomizer, Inc., Columbia, Md.), as follows:
Inlet air temperature: 192° C.
Spinning Disc RPM's: 400 KPa (58 psig)
Slurry feed rate: 2.4 L/hr
Outlet temperature: 79.3° C.
Cyclone magnahelic pressure: 0.47 in $H_2O$ ($1.19 \times 10^{-3}$ $kg/cm^2$).

Recovered dried potassium nickel hexacyanoferrate was observed under an SEM (Cambridge model S240) to be spherical in shape. Measurement of the particles using a Horiba Model LA-900 Particle Size Analyzer (Horiba Instruments, Inc., Irvine, Calif.), showed an average particle size of approximately 9.5 micrometers with about 10 weight percent of the particle less than 5 micrometers.

The spherical particles were heated in an air-vented oven at approximately 115° C. for 18 hours. Recovery from heating was essentially quantitative, and no loss of size or shape was noted as a result of the heating procedure.

FIG. 1 shows that the particle size distribution of the KNIHEX particles was monodisperse.

Example 6 (Comparative)

Potassium nickel hexacyanoferrate was prepared as described in Example 5, except that the solid precipitate obtained from the final centrifuge wash was spread out in a thin layer about 2.5 cm thick on a drying tray and heated in air at 115° C. for 18 hours until the solid had dried. The dried solid was broken up from its clumps using a mortar and pestle. The material was then ground with a ball mill using Zirconia media for 90 minutes. The average particle size was 16.77 micrometers with about 30% of the material less than 5 micrometers in size. The particles were observed under an SEM (Cambridge Model S240) and found to be typically irregular in shape (significant deviation from spherical).

FIG. 2 shows the particle size distribution of the ground KNIHEX particles was large compared to that of Example 5 (FIG. 1) where the particle size distribution was narrow.

Example 7

Ammonium ferric hexacyanoferrate ($NH_4Fe^{III}[Fe^{II}(CN)_6]$) was prepared by slowly adding an aqueous solution of 1 part 0.3 M ammonium ferrocyanide (0.86 moles) (pH was adjusted to pH 5.0–5.1 using concentrated acetic acid) cooled to between 0° C. and 4° C. at to an aqueous solution of 1 parts 0.5 M ferric nitrate (0.86 moles) cooled to between 0° C. and 4° C. with constant stirring. Precipitate was separated from the reaction mixture using a centrifuge (Centrifuge Model 460G, International Equipment Company, Boston, Mass.) by separating the initial precipitate, then repeatedly slurrying the precipitate in water and re-centrifuging, for a total of four washings.

The clean precipitate was again slurried in water at a concentration of 7.5 percent by weight, then spray-dried using a Niro Atomizer, Serial #2402 spray dryer (Niro Atomizer, Inc., Columbia, Md.), as follows:
Inlet air temperature: 190° C.
Spinning Disc RPM's: 400 KPa (58 psig)
Slurry feed rate: 2.4 L/hr
Outlet temperature: 67.6° C.
Cyclone magnahelic pressure: 0.47 in $H_2O$ ($1.19 \times 10^{-3}$ $kg/cm^2$)

Recovered dried ammonium ferric hexacyanoferrate was observed under an SEM (Cambridge model S240) to be spherical in shape. Measurement of the particles using a Horiba Model LA-900 Particle Size Analyzer (Horiba Instruments, Inc., Irvine, Calif.), showed an average particle size of approximately 16.11 micrometers with less than about 10 weight percent of the particles less than 5 micrometers.

The spherical particles were heated in an air-vented oven at approximately 115° C. for 18 hours. Recovery from heating was essentially quantitative, and no loss of size or shape was noted as a result of the heating procedure.

Example 8 (Comparative)

Ammonium ferric hexacyanoferrate was prepared as described in Example 7, except that the solid precipitate obtained from the final centrifuge wash was spread out in a thin layer about 2.5 cm thick on a drying tray and heated in air at 115° C. for 18 hours until the solid had dried. The dried solid was broken up from its clumps using a mortar and pestle. The material was then ground with a ball mill using Zirconia media for 40 minutes. The average particle size was 5.00 micrometers with about $^{98}$% of the material less than 5 micrometers in size. The particles were typically irregular in shape (significant deviation from spherical).

Example 9

Potassium nickel hexacyanoferrate (KNIHEX) was prepared by slowly adding an aqueous solution of 1 part 0.3 M potassium ferrocyanide (0.29 moles) (pH was adjusted to 5.0–5.1 using concentrated acetic acid) cooled to between 0° C. and 4° C. at to an aqueous solution of 1.44 parts 0.3 M nickel nitrate (0.42 moles) cooled to between 0° C. and 4° C. with constant stirring. Precipitate was separated from the reaction mixture using a centrifuge (Centrifuge Model 460G, International Equipment Company, Boston, Mass.) by separating the initial precipitate, then repeatedly slurrying the precipitate in water and re-centrifuging, for a total of four washings.

The clean precipitate was again slurried in water at a concentration of 7.5 percent by weight, then spray-dried using a Niro Atomizer, Serial #2402 spray dryer (Niro Atomizer, Inc., Columbia, Md.), as follows:
Inlet air temperature: 192° C.
Spinning Disc RPM's: 400 KPa (58 psig)
Slurry feed rate: 2.4 L/hr
Outlet temperature: 79.3° C.
Cyclone magnahelic pressure: 0.47 in $H_2O$ ($1.19 \times 10^{-3}$ $kg/cm^2$).

Recovered dried potassium nickel hexacyanoferrate was observed under an SEM (Cambridge model S240) to be spherical in shape. Measurement of the particles using a Horiba Model LA-900 Particle Size Analyzer (Horiba Instruments, Inc., Irvine, Calif.), showed an average particle size of approximately 12 micrometers with less than about 10% of the particle less than 5 micrometers.

The spherical particles were heated in an air-vented oven at approximately 115° C. for 18 hours. The yield was 78% by weight of the reacted prepared material. No change in size or shape was noted as a result of the heating procedure.

Example 10 (Comparative)

Potassium nickel hexacyanoferrate was prepared as described in Example 9, except that the solid precipitate obtained from the final centrifuge wash was spread out in a thin layer about 2.5 cm thick on a drying tray and heated in air at 115° C. for 18 hours until the solid had dried. The dried solid was broken up from its clumps using a mortar and pestle. The material was then ground in a freezer mill (SPEX model 6700 SPEX Industries, Inc., Edison, N.J.) for 6 minutes. The material was sieved with a 200 mesh screen (74 $\mu$m) to remove large particles and then hydrocycloned to remove fines below 5 $\mu$m. The average particle size after hydrocycloning was 21 micrometers with about 27 weight percent of the material less than 5 micrometers in size. The particles were typically irregular in shape (significant deviation from spherical). The total yield after grinding, sieving and hydrocycloning was 3.7%.

Example 11

Ammonium ferric hexacyanoferrate was prepared by slowly adding an aqueous solution of 1 part 0.3 M ammonium ferrocyanide (0.35 moles) (pH was adjusted to pH 5.0–5.1 using concentrated acetic acid) cooled to between 0° C. and 4° C. at to an aqueous solution of 2 parts 0.5 M ferric nitrate (0.50 moles) cooled to between 0° C. and 4° C. with constant stirring. Precipitate was separated from the reaction mixture using a centrifuge (Centrifuge Model 460G, International Equipment Company, Boston, Mass.) by separating the initial precipitate, then repeatedly slurrying the precipitate in water and re-centrifuging, for a total of four washings.

The clean precipitate was again slurried in water at a concentration of 7.5 percent by weight, then spray-dried using a Niro Atomizer, Serial #2402 spray dryer (Niro Atomizer, Inc., Columbia, Md.), as follows:
Inlet air temperature: 192° C.
Spinning Disc RPM's: 400 KPa (58 psig)
Slurry feed rate: 2.4 L/hr
Outlet temperature: 79.3° C.
Cyclone magnahelic pressure: 0.47 in $H_2O$ ($1.19 \times 10^{-3}$ $kg/cm^2$).

Recovered dried ammonium ferric hexacyanoferrate represented 75 percent yield, and was observed under an SEM (Cambridge model S240) to be spherical in shape. Measurement of the particles using a Horiba Model LA-900 Particle Size Analyzer (Horiba Instruments, Inc., Irvine, Calif.), showed all average particle size or approximately 14.0 micrometers with less than about 10% of the particle less than 5 micrometers.

The spherical particles were heated in an air-vented oven at approximately 115° C. for 18 hours. No change of size or shape was noted as a result of the heating procedure.

Example 12 (Comparative)

Ammonium ferric hexacyanoferrate was prepared as described in Example 11, except that the solid precipitate obtained from the final centrifuge wash was spread out in a thin layer about 2.5 cm thick on a drying tray and heated in air at 115° C. for 18 hours until the solid had dried. The dried solid was broken up from its clumps using a mortar and pestle. The average particle size was 1.15 $\mu$m micrometers with 98.5% of the material less than 5 micrometers. The particles were typically irregular in shape (significant deviation from spherical) and were too small to process further. 98.5% of the material was less than 5 $\mu$m in size. The yield was 1.5%.

Example 13

A particle-filled porous web was prepared from the spherical potassium cobalt hexacyanoferrate particles of Example 1. An agitated slurry of 20 g Kevlar™ 11:306 dry aramid fiber pulp (DuPont, Wilmington, Del.) in 2000 g water was blended in a 4 L Waring™ blender at a low speed for 30 seconds, then mixed with 0.25 g Tamol 850™ dispersant (Rohm & Haas Co., Philadelphia, Pa.), followed by 8.75 g (3.5 g dry weight) Goodrite™ 1800X73 styrene-butadiene latex binder aqueous slurry (B. F. Goodrich Co., Brecksville, Ohio). Blending was continued for 30 seconds at a low speed. To this mixture was added 53.6 g potassium cobalt hexacyanoferrate, followed by 20 g powdered alum (aluminum sulfate), and stirring was continued for an additional minute. The mixture was poured into a Williams sheet mold (Williams Apparatus Co., Watertown, N.Y.) equipped with a 930.3 $cm^2$ porous screen having pores of approximately 0.14 mm (100 mesh) at the bottom to allow water to drain. The resulting wet sheet was pressed in a pneumatic press (Mead Fluid Dynamics, Chicago, Ill.) at approximately 620 KPa for approximately five minutes to remove additional water. Drain time was 25 seconds, and no loss of KCOHEX could be observed in the drain water. Finally, the porous web was dried in an oven at 250° F. (121° C.) for 120 minutes.

Example 14 (Comparative)

Example 13 was repeated using ground and sized particulate as obtained in Example 2 in place of spray-dried particles. Drain time was 60 seconds. This showed that prior art particles loaded in a web, required more than 2 times the drain time compared to spray-dried particles of the invention loaded in the web.

Example 15

A 90 mm diameter disk having a thickness of 3.2 mm was die cut from the particle-filled porous web of Example 13. The disk was placed in a stainless steel disk holder (Cole Parmer Instrument Co., Niles, Ill.) fitted with inlet and outlet pipes, so that the effective disk diameter was 80 mm. The disk was washed with water, then an aqueous solution containing 12 mg/L cesium ion was pumped first through two canister-style prefilters in series (Filtrete™ Cartridges, Memtec America Corp., Timonium, Md.) then through the disk at a flow rate of 105 mL/min., which corresponds to 6.49 bed volumes/min., wherein bed volume means the volume of the disk. Cesium removal, reported as $C/C_o$, where C represents the cesium concentration in the effluent and $C_o$ represents initial cesium concentration, as a function of bed volumes is shown in Table 1. The pressure drop across the membrane was found to be constant at 55 KPa throughout the evaluation.

TABLE 1

| Bed Volumes | C/Co |
|---|---|
| 0 | 0 |
| 389 | 0 |
| 778 | 0 |
| 1167 | 0.019 |
| 1557 | 0.167 |
| 1946 | 0.358 |
| 2335 | 0.60 |
| 2724 | 0.717 |
| 3113 | 0.792 |
| 3506 | 0.833 |
| 4186 | 0.917 |

The data of Table 1 show that spherical KCOHEX particles in a porous web are very effective in removing Cesium ions from aqueous solution.

Example 16

A particle-filled porous web was prepared from the spherical potassium zinc hexacyanoferrate particles of Example 3. Into a 4 L Waring™ blender was added 2000 g water with 0.25 g Tamol 850™ dispersant (Rohm & Haas Co., Philadelphia, Pa.) and then 9.6 g Kevlar™ 1F306 dry aramid fiber pulp (DuPont, Wilmington, Del.) was added and blended at low speed for 30 seconds. To this slurry was then added 36 g of the particle from Example 3 with blending on low speed, followed by 6.15 g (2.4 g dry weight) Goodrite™ 1800X73 styrene-butadiene latex binder aqueous slurry (B. F. Goodrich Co., Brecksville, Ohio). Blending was continued for 30 seconds at a low speed. To this mixture was added 20 g of a 25% solution of Alum (aluminum sulfate in water), and stirring was continued for an additional minute. After which 1 gram of a 1% solution of Nalco 7530 (Nalco Chemical Company, Chicago, Ill.) was added and the solution mixed 3 seconds on low. The mixture was poured into a Williams sheet mold (Williams Apparatus Co., Watertown, N.Y.) equipped with a 413 cm² porous screen having a pore size of 80 mesh (approximately 177 μm) at the bottom to allow water to drain, drain time was 120 seconds. The resulting wet sheet was pressed in a pneumatic press (Mead Fluid Dynamics, Chicago, Ill.) at approximately 551 KPa for approximately five minutes to remove additional water. Finally, the porous web was dried on a handsheet dryer for 120 minutes at 150° C.

Example 17

Example 16 was repeated using ground and sized particulate as obtained in Example 4 in place of spray-dried particles. Drain time was 240 seconds. This showed that prior art particles loaded in a web required 2 times the drain time compared to spray-dried particles of the invention loaded in a web.

Example 18

A particle-filled porous web was prepared from the spherical potassium nickel hexacyanoferrate particles of Example 5. Into a 4 L Waring™ blender was added 2000 g water with 0.25 g Tamol 850™ dispersant (Rohm & Haas Co., Philadelphia, Pa.) and then 14.35 g Kevlar™ 1F306 (12 g, 83.5% solids) aramid fiber pulp (DuPont, Wilmington, Del.) was added and blended at low speed for 30 seconds. To this slurry was then added 45 g of the particle from Example 5 with blending on low speed, followed by 7.69 g (3.0 g dry weight) Goodrite™ 1800x X 73 styrene-butadiene latex binder aqueous slurry (B. F. Goodrich Co., Brecksville, Ohio). Blending was continued for 30 seconds at a low speed. To this mixture was added 20 g of a 25% solution of Alum (aluminum sulfate in water), and stirring was continued for an additional minute. After which 1 gram of a 1% solution of Nalco 7530 (Nalco Chemical Company, Chicago, Ill.) was added and the solution mixed 3 seconds on low. The mixture was poured into a Williams sheet mold (Williams Apparatus Co., Watertown, N.Y.) equipped with a 413 cm² porous screen having a pore size of 80 mesh (approximately 177 μm) at the bottom to allow water to drain, drain time was 30 seconds. The resulting wet sheet was pressed in a pneumatic press (Mead Fluid Dynanics, Chicago, Ill.) at approximately 551 KPa for approximately five minutes to remove additional water. Finally, the porous web was dried on a handsheet dryer for 120 minutes at 150° C.

Example 19

Example 18 was repeated using ground particles obtained in Example 6 in place of spray-dried particles. Drain time was 45 seconds. This showed that prior art particles loaded in a web required more thin 1.5 times the drain time compared to spray-dried particles of the invention loaded in a web.

Example 20

A particle-filled porous web was prepared from the spherical ammonium ferric hexacynoferrate particles of Example 7. Into a 4 L Waring™ blender was added 2000 g water with 0.25 g Tamol 850™ dispersant (Rohm & Haas Co., Philadelphia, Pa.) and then 12.9 g Kevlar™ 1F306 (10.8 g, 83.5% solids) aramid fiber pulp (DuPont, Wilmington, Del.) was added and blended at low speed for 30 seconds. To this slurry was then added 40.5 g of the particle from Example 7 with blending on low speed, followed by 6.9 g (2.7 g dry weight) Goodrite™ 1800 X 73 styrene-butadiene latex binder aqueous slurry (B. F. Goodrich Co., Brecksville, Ohio). Blending was continued for 30 seconds at a low speed. To this mixture was added 20 g of a 25% solution of Alum (aluminum sulfate in water), and stirring was continued for an additional minute. After which 1 gram of a 1% solution of Nalco 7530 (Nalco Chemical Company, Chicago, Ill.) was added and the solution mixed 3 seconds oil low. The mixture was poured into a Williams sheet mold (Williams Apparatus Co., Watertown, N.Y.) equipped with a 413 cm² porous screen having a pore size of 80 mesh (approximately 177 μm) at the bottom to allow water to drain, drain time was 15 seconds. The resulting wet sheet was pressed in a pneumatic press (Mead Fluid Dynamics, Chicago, Ill.) at approximately 551 KPa for approximately five minutes to remove additional water. Finally, the porous web was dried on a handsheet dryer for 120 minutes at 150° C.

Example 21

Example 20 was repeated using ground and sized particulate as obtained in Example 8 place of spray-dried particles. Drain time was 120 seconds. This showed that the prior particles loaded in a web required 8 times the drain time compared to spray-dried particles of the invention loaded in a web.

Example 22

A 25 mm diameter disk having a thickness of 1.98 mm was die cut from the particle-filled porous web of Example 20, spray dried $NH_4Fe^{III}(Fe^{II}(CN)_6)$. The disk weight was 0.69 g with 72.7% particle, weight of particle in membrane at 22 mm (flow area) was 0.39 g. The disk was placed in a stainless steel disk holder (Cole Parmer Instrument Co., Niles, Ill.) fitted with inlet and outlet pipes, so that the effective disk diameter was 22 mm. The disk was washed with water, then an aqueous solution containing 50 mg/L cesium ion was pumped through the disk at a flow rate of 5 mL/min., which corresponds to 6.6 bed volumes/min., wherein bed volume means the volume of the disk. Cesium removal, reported as $C/C_o$, where C represents the cesium concentration in the effluent and $C_o$ represents initial cesium concentration, as a function of bed volumes is shown in Table 2.

TABLE 2

| Bed Volumes | C/Co | ΔP (Kpa) |
| --- | --- | --- |
| 0 | 0 | 21 |
| 32 | 0.016 | 21 |
| 66 | 0.188 | 21 |
| 99 | 0.447 | 21 |
| 132 | 0.498 | 21 |
| 232 | 0.597 | 21 |
| 298 | 0.662 | 21 |
| 365 | 0.731 | 21 |
| 464 | 0.707 | 21 |
| 597 | 0.738 | 21 |
| 730 | 0.826 | 21 |
| 1129 | 0.866 | 27 |

The data of Table 2 show that spherical $NH_4FEHEX$ particles in a porous web are effective in removing cesium ions from aqueous solution. The back pressure build up was constant (i.e. about 21 KPa) during about ¾ of the run, and increased slightly to about 27 KPa at the end of the run.

Example 23 (Comparative)

A 25 mm diameter disk having a thickness of 2.16 mm was die cut from the particle-filled porous web of Example 21, ground $NH_4Fe^{III}(Fe^{II}(CN)_6)$. The disk weight was 0.76 g and contained 72% by weight particle, therefore at 22 mm (flow area) the particle weight was 0.34 g. The disk was placed in a stainless steel disk holder (Cole Parmer Instrument Co., Niles, Ill.) fitted with inlet and outlet pipes, so that the effective disk diameter was 22 mm. The disk was washed with water, then an aqueous solution containing 50 mg/L cesium ion was pumped through the disk at a flow rate of mL/min., which corresponds to bed volumes/min., wherein bed volume means the volume of the disk. Cesium removal, reported as $C/C_o$, where C represents the cesium concentration in the effluent and $C_o$ represents initial cesium concentration, as a function of bed volumes is shown in Table 3. The pressure drop across the membrane increased to 151 KPa during the evaluation.

TABLE 3

| Bed Volumes | C/Co | ΔP (Kpa) |
| --- | --- | --- |
| 47 | 0.34 | 41 |
| 94 | 0.54 | 41 |
| 141 | 0.50 | 48 |
| 188 | 0.45 | 55 |
| 235 | 0.43 | 55 |
| 376 | 0.37 | 66 |
| 471 | 0.34 | 69 |
| 565 | 0.37 | 76 |
| 753 | 0.40 | 90 |
| 942 | 0.45 | 97 |
| 1130 | 0.52 | 110 |

The data of Table 3 show that irregular $NH_4FEHEX$ particles in a porous web are effective in removing cesium ions from aqueous solution. The back pressure build up during the evaluation was 1.51 KPa which was more than five times greater than back-pressure for the spray-dried material in Example 22.

Example 24

Comparative capacity data derived from $K_d$ determination is presented in Table 4 below, both for spray-dried and ground material.

TABLE 4

| Particle | Example Number | Processing Method | Capacity (g Cs/g particle) |
| --- | --- | --- | --- |
| $K_2ZnFe(CN)_6$* | 4 | Raw product | 0.1125 |
| $K_2ZnFe(CN)_6$ | 3 | Spray dried | 0.115 |
| $KNiFe(CN)_6$* | 6 | Ground | 0.0997 |
| $KNiFe(CN)_6$ | 5 | Spray dried | 0.1093 |

*comparative

The data of Table 4 show that the capacities for spray-dried materials of the invention were improved compared to a raw product of ground particles.

Example 25 Mixed Metal Hexacyanoferrate adsorbents

Table 5, below, gives compositions and capacities for cesium for a number of adsorbents with a composition of potassium metal hexacyanoferrate where metal may be cobalt, copper, nickel, zinc or mixtures of those metals.

TABLE 5

| Particle | Metal/metal ratio | Capacity mMol/gram |
| --- | --- | --- |
| KCOCUHEX | Co/Cu = 1 | 0.84 |
| KCOCUHEX | Co/Cu = 1/3 | 0.84 |
| KCOCUHEX | Co/Cu = 3 | 0.79 |
| KCOCIHEX | Co/Ni = 1 | 0.81 |
| KCOCIHEX | Co/Ni = 1/3 | 0.78 |
| KCOHEX | KCOHEX | 0.85 |
| KCOZNHEX | Co/Zn = 1 | 0.79 |
| KCOZNHEX | Co/Zn = 1/3 | 0.81 |
| KCOZNHEX | Co/Zn = 3 | 0.83 |
| KCOZNHEX | Cu/Zn = 1 | 0.79 |
| KZNHEX | KZNHEX | 0.85 |
| KCUHEX | KCUHEX | 0.76 |
| KCOCUHEX | Co/Cu = 1/2 | 0.77 |
| KCOCUHEX | Co/Cu = 2 | 0.81 |
| KCOZNHEX | Co/Zn = 1/2 | 0.41 |

All of these adsorbents were prepared essentially following the procedure given in Example 1 using appropriate starting materials. In all cases an excess of metal (as compared with potassium) existed and amounts of the solutions of each metal were adjusted to yield the ratios shown in the second column.

All of these compositions had good or high capacity for cesium and all had reasonably low solubility.

Various modifications and alterations that do not depart from the scope and intent of this invention will become apparent to those skilled in the art. This invention is not to be unduly limited to the illustrative embodiments set forth herein.

I claim:

1. A composite sheet comprising spray-dried, monodisperse, substantially spherical, sorbent (alkali metal or ammonium) (metal) hexacyanoferrate particles and combinations thereof enmeshed in a nonwoven fibrous web or a cast membrane wherein said metal is selected from the group consisting of Periodic Table (CAS version) Groups VIII, IB, and IIB, said spray-dried sorbent particles having an average size in the range of 1 to 500 micrometers, and said spray-dried sorbent particles being active towards Cs metal ions.

2. The composite sheet according to claim 1, wherein said particles are selected from the group consisting of potassium and ammonium (metal) hexacyanoferrates wherein metal is selected from the group consisting of Fe, Ru, Os, Rh, Ir, Co, Ni, Pd, Pt, Cu, Ag, Au, Zn, Cd, and Hg.

3. The composite sheet according to claim 1 wherein said particles are selected from the group consisting of potassium cobalt hexacyanoferrate (KCOHEX), potassium zinc hexacyanoferrate (KZNHEX), potassium copper hexacyanoferrate, potassium nickel hexacyanoferrate, potassium cadmium hexacyanoferrate, potassium iron hexacyanoferrate, and ammonium iron hexacyanoferrate.

4. The composite sheet according to claim 3 wherein said particles comprise potassium cobalt hexacyanoferrate.

5. The composite sheet according to claim 3 wherein said particles comprise zinc hexacyanoferrate.

6. The composite sheet according to claim 3 wherein said particles comprise potassium copper hexacyanoferrate.

7. The composite sheet according to claim 3 wherein said particles comprise potassium nickel hexacyanoferrate.

8. The composite sheet according to claim 3 wherein said particles comprise potassium cadmium hexacyanoferrate.

9. The composite sheet according to claim 3 wherein said particles comprise potassium iron hexacyanoferrate.

10. The composite sheet according to claim 3 wherein said particles comprise ammonium iron hexacyanoferrate.

11. The composite sheet according to claim 3 wherein said particles comprise a combination of any of said hexacyanoferrates.

12. The composite sheet according to claim 1 wherein said particles have an average size in the range of 1 to 60 micrometers.

13. The composite sheet according to claim 1 wherein said nonwoven fibrous web comprises fibrillated polytetrafluoroethylene (PTFE).

14. The composite sheet according to claim 1 wherein said nonwoven fibrous web comprises a fibrous pulp.

15. The composite sheet according to claim 1 wherein said nonwoven fibrous web comprises a macroporous fibrous web.

16. The composite sheet according to claim 1 wherein said nonwoven fibrous web comprises a microporous fibrous web.

17. The composite sheet according to claim 1 further comprising a hydrocarbon binder.

18. The composite sheet according to claim 1 wherein said particles have an average size in the range of 9 to 12 micrometers.

* * * * *

UNITED STATES PATENT AND TRADEMARK OFFICE
CERTIFICATE OF CORRECTION

PATENT NO. : 6,093,664
DATED : July 25, 2000
INVENTOR(S) : Lloyd R. White and Susan H. Lundquist It is certified that error appears in the above-identified patent and that said Letters Patent is hereby corrected as shown below:

Column 4,
Line 66, "tile" should read -- "the" --.

Column 5,
Line 54, "tile" should read -- "the" --.

Column 7,
Line 14, "Tile" should read -- "The" --.

Column 14,
Line 51, "$^{98}\%$" should read -- "98%" --.

Column 19,
Line 1, delete -- "the" -- after "that".
Line 2, add -- "art" -- after "prior".

Signed and Sealed this

Sixteenth Day of April, 2002

Attest:

JAMES E. ROGAN
*Director of the United States Patent and Trademark Office*

*Attesting Officer*